Patented Oct. 16, 1934

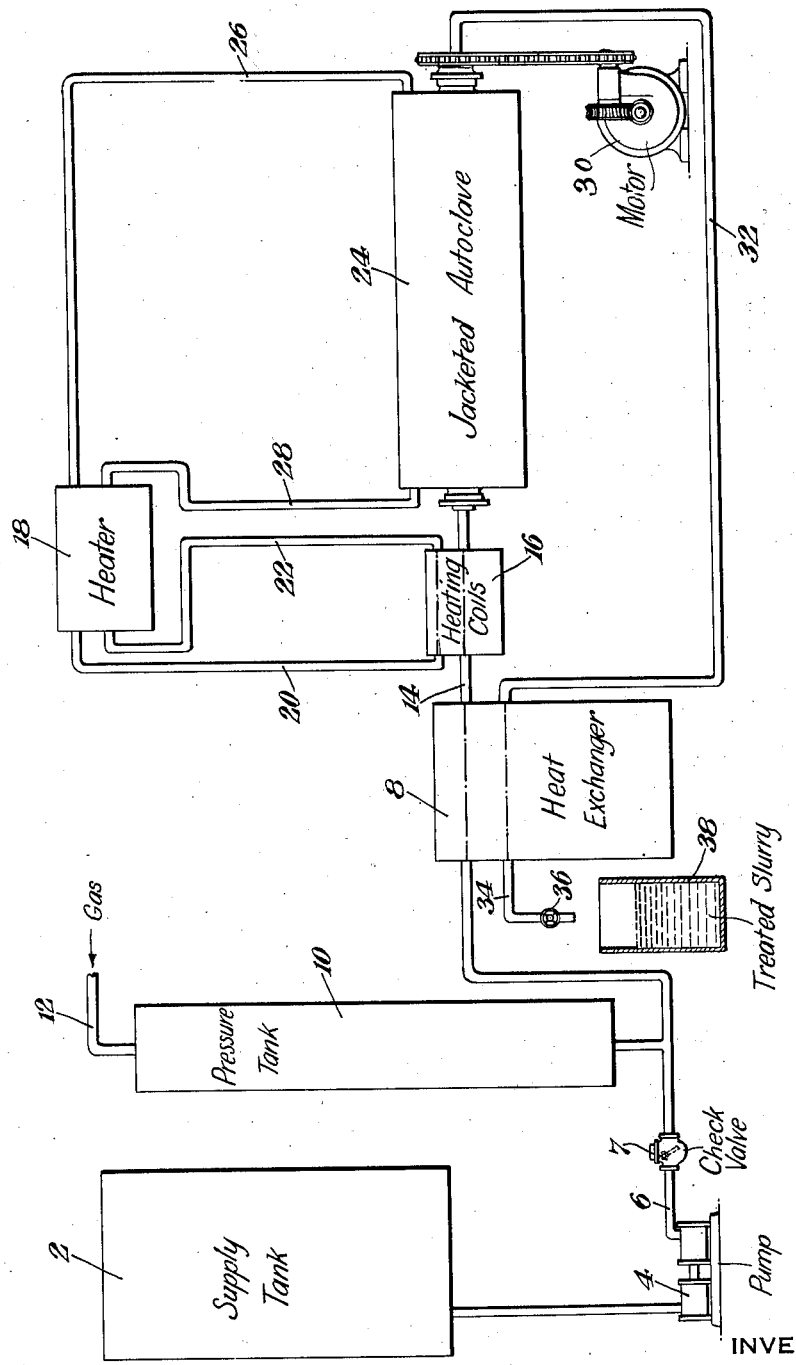

1,977,582

UNITED STATES PATENT OFFICE 1,977,582

METHOD OF HANDLING PIGMENTS FOR HEAT TREATMENT

Marion L. Hanahan, East Orange, N. J., assignor, by mesne assignments, to Krebs Pigment & Color Corporation, Wilmington, Del., a corporation of Delaware Application April 22, 1931, Serial No. 531,945

7 Claims. (Cl. 134—58)

This invention relates to a particular method of handling pigments so as to subject them to the action of high temperatures and pressures in the presence of moisture, and may be considered as a particular form of and method of utilizing the invention broadly disclosed in the co-pending application of Chester C. Feagley, Serial No. 532,135 filed on even date herewith. The present application contains matter derived from and is in part a continuation of my earlier application, Serial No. 409,294, filed November 23, 1929.

According to my process, the pigment, in a finely divided state, is combined with water to form a slurry, or liquid suspension, and is then forced substantially continuously through a heated zone while the pressure is maintained high enough to permit the continuous introduction of material to be treated, against the back pressure. An appropriate valve is maintained at the discharge end of the system through which the treated material is permitted to pass at approximately the same rate as it is introduced at the feed end.

Various forms of apparatus may be used for heat treating the material as, for example, the slurry may be passed continuously through coils which are heated externally, or may be passed into an autoclave so arranged that as new material is introduced into the autoclave, the treated material will be ejected therefrom. For the purpose of economy it is highly desirable to arrange for a heat exchanger so that the material which has been subjected to high temperatures may give up a large part of its heat to material that is being introduced into the apparatus. It is also advisable to maintain a pressure regulating device connected with the system so that a substantially constant pressure and flow of material may be maintained.

The temperatures used in the heated zone may vary over a wide range, as for example, from between 200° C. to in the order of 700° C., though if the critical point of water is passed, particular means may have to be employed to maintain the pigment in motion so that as the temperature drops, the water will condense to re-establish the slurry; otherwise, stoppages may occur. For this reason, I find it more practical to keep the temperature below the critical point of water (375° C.). I also find that at temperatures as low as 200° C. the effect is unduly slow and accordingly I find it advantageous to operate at temperatures above 250° C. and preferably above 300° C.

The pressure may be just enough above the pressure of saturated steam at the given subcritical temperatures (or when working above the critical temperature, it should be above the critical pressure), so that the material is fed forward constantly, but higher pressures may be used without injury, though there apparently is no particular advantage in using such high pressures and they simply add to the cost of equipment. Thus the pressures used may vary from about 215 pounds gauge pressure up to in excess of 6,000 pounds. The time of treatment will vary with the temperature and may range from 5 or 10 minutes up to several hours.

I find that by operating in this manner and maintaining the temperatures and pressures so adjusted that substantially all the moisture remains in the liquid phase, that the process can be conducted continuously at relatively low cost and with great efficiency.

For the purposes of illustration, I show in the accompanying drawing, an apparatus that may be used for carrying out my process. In the drawing, 2 is a storage tank for the pigment mixed with water to form a slurry. This slurry is withdrawn from tank 2 by pump 4 which forces the material under pressure through pipe 6, provided with check valve 7, into the heat exchanger 8. Preferably connected to the pipe 6 is a pressure reservoir 10 wherein the pressure is maintained substantially constant while permitting limited variations in volume, as by having this reservoir connected by pipe 12 with any desired source of high pressure inert gas, such as nitrogen. If preferred, a hydraulic accumulator may be used with approximately equal results.

It is to be understood that heat exchanger 8 is provided with the usual coils which are not here shown, but the connections between the two pipe systems are indicated by dot and dash lines. After passing through the coils of the heat exchanger, the warmed up slurry passes through pipe 14 into the heating coils indicated at 16. These coils are heated externally in any desired way as by an appropriate form of vapor such as mercury vapor or the vapor of diphenyl, which is supplied from a heater 18 through a pipe 20 and returns through a pipe as indicated at 22. The slurry which has been brought up to the desired temperature in the heating coils 16 passes into the jacketed autoclave 24 which is likewise heated as by vapor from heater 18 (or in any other desired manner), the supply line for the vapor being indicated diagrammatically at 26 and the return at 28. The autoclave 24 is supplied with appropriate stirring mechanism which may be driven by a motor 30.

After the slurry has passed slowly through the autoclave 24, it comes out through pipe 32 and is returned to the heat exchanger 8 and finally is discharged through pipe 34 which is provided with appropriate valve 36. A receptacle for the finished product is indicated at 38. Valve 36 (which may be either a hand-operated valve or an automatic pressure release valve) must be set to restrict the discharge orifice to maintain the desired pressure in the system, and the pump 4 must have sufficient power to force the slurry through the system against the back pressure created by the partial closing of valve 36 and also to maintain the amount of water and pressure sufficient so that while the temperature is below the critical temperature of water, all of the water will be held in the liquid phase, that is, the pump must keep the pressure system full of slurry under sufficient pressure so that no steam pockets will be formed until the critical temperature is reached. Thus if the temperature is to approach the critical point, the pressure should definitely exceed the critical pressure.

By thus keeping the slurry so that there is no opportunity for the water to separate from the slurry in the form of steam, the slurry will expand and contract substantially as a homogeneous mixture and the relative masses of the solid material and water are maintained substantially constant throughout the pressure system. Apparently it is the relative mass of surrounding water which is important, and my invention not only permits me to make the process continuous, but also gives a ready method of maintaining the mass ratio substantially constant over a wide range of temperatures and of maintaining this mass ratio proportional to a mass ratio of subdivided solid particles suspended in water, even after the critical temperature has been passed, thereby aiding in standardization of results. In the present case, this is primarily made possible by the fact that the pressure is maintained substantially constant while permitting the slurry to expand under the influence of heat, rather than having the pressure a function of the temperature. As regards the mass ratio used, I have found that the process can be operated successfully using less than one part of water with one part of pigment, though ordinarily I find that the material is easier to handle if somewhat more water is employed.

The maintenance of the mass ratio between the water and pigment not only affects the process, but is also of very considerable value in obtaining heat efficiency for all the heat given to the slurry may be returned to the heat exchanger except such losses as occur through radiation. In this connection, it is of course to be understood that the pipes and various items of equipment will be properly insulated to conserve heat, and it is also to be understood that the autoclave 24 and heater coils 16 may be heated in any desired fashion as for example by gas, or electrical resistance elements.

Instead of cooling the autoclaved slurry to a point where it will remain liquid after having passed the relief valve, I may dispense with the cooling, and/or part of the heat exchange and locate the relief valve at a point of the system where the slurry has a temperature substantially above 100° C. The relief valve should then lead into a collecting chamber and the water of the slurry will be immediately evaporated and the pigment settle out in the chamber in solid and dry form.

This process may be applied to any pigment where it is desired to subject the same to the combined action of heat and pressure in the presence of moisture, and I have found that it is particularly useful in the treatment of lithopone or other pigments comprising zinc sulphide, but I do not intend to limit its use to this particular class of pigments, though in this case there appear to be indications that some advantageous results are obtained by maintaining the pigment actually in the form of a liquid suspension during the heat treatment. With zinc sulphide pigments, the best results that I have obtained have been where the precipitated material is prepared in the manner set forth in my co-pending application, Serial No. 531,946, filed Apr. 22, 1931.

While this process has been discussed in connection with the use of water as the liquid medium, it is my belief that more or less valuable results can be obtained using other liquids, particularly if small amounts of water are present such as ordinarily will be held by adsorption or present as water of hydration. I should expect that the most satisfactory results would be obtained using liquids having a relatively high critical temperature particularly liquids in which the pigment may be very slightly soluble. Accordingly, I believe that the most probable liquids to substitute for water are relatively high boiling liquids having a hydroxyl group, such as glycerine or other alcohol or phenol, though it may be possible to use rather low boiling materials such as ammonia. These or other soluble substances may if desired be included with water.

What I claim is:

1. The process of treating pigments which comprises forming a slurry comprising a subdivided pigment and water and heating such slurry to a temperature ranging upward from 200° C. while maintaining the pressure and amount of water in the slurry sufficient, when the temperature is below the critical temperature of water, substantially to fill with water in the liquid phase the space not occupied by solids.

2. The process of treating pigments which comprises forming a slurry comprising a subdivided pigment and a liquid and heating such slurry to a temperature ranging upward from 200° C. while maintaining the pressure and amount of liquid in the slurry sufficient, when the temperature is below the critical temperature of such liquid, substantially to fill with such liquid in the liquid phase the space not occupied by solids.

3. The process of treating pigments which comprises forming a slurry of a subdivided pigment and water and heating such slurry to a temperature ranging between 200° C. and the critical temperature of water, while maintaining the pressure and amount of water great enough substantially to keep the water in the liquid phase.

4. The process of treating pigments which comprises forming a slurry comprising a pigment and water, subjecting such slurry to an elevated pressure, progressively heating the slurry to a temperature ranging between 200° C. and 700° C. and permitting such slurry to expand away from such pressure while maintaining the pressure and amount of water in the slurry sufficient, when the temperature is below the critical temperature of water, substantially to fill with water in the liquid phase the space not occupied by solids.

5. The process of treating pigments which comprises forming a slurry comprising a pigment and water, forcing such slurry through a pressure system having a restricted orifice, heating the slurry in a part of such pressure system to a temperature of between 200° C. and 700° C. while maintaining the pressure and amount of water in the slurry sufficient, when the temperature is below the critical temperature of water, substantially to fill with water in the liquid phase the space not occupied by solids.

6. The process of treating pigments which comprises forming a slurry comprising at least one part of water for one part of pigment and progressively heating such slurry to a temperature ranging between 200° C. and 700° C. while maintaining the relative masses of the water and solids in such slurry substantially constant.

7. In the process of treating pigments, the step of treating a suspension of a pigment in a liquid at a temperature substantially above the normal boiling point of such liquid, while maintaining the pressure above the pressure of a saturated vapor of such liquid at such temperature, whereby vaporization of the liquid is substantially prevented.

MARION L. HANAHAN.